(12) United States Patent
Tropp

(10) Patent No.: US 9,879,447 B2
(45) Date of Patent: *Jan. 30, 2018

(54) METHOD OF IMPROVING AIRLINE LUGGAGE INSPECTION

(71) Applicant: David Tropp, Brooklyn, NY (US)

(72) Inventor: David Tropp, Brooklyn, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/744,261

(22) Filed: Jan. 17, 2013

(65) Prior Publication Data

US 2013/0227995 A1    Sep. 5, 2013

Related U.S. Application Data

(63) Continuation of application No. 13/412,233, filed on Mar. 5, 2012, which is a continuation of application
(Continued)

(51) Int. Cl.
*G06Q 10/10* (2012.01)
*G06Q 40/08* (2012.01)
(Continued)

(52) U.S. Cl.
CPC ............ *E05B 67/00* (2013.01); *E05B 35/105* (2013.01); *E05B 37/0034* (2013.01);
(Continued)

(58) Field of Classification Search
CPC .................................................... G06Q 50/265
(Continued)

(56) References Cited

U.S. PATENT DOCUMENTS 2,049,416 A    9/1930   Aldeen
2,433,114 A    12/1947  Gray
(Continued)

FOREIGN PATENT DOCUMENTS

EP    0414165        2/1991
EP    1529907 A2     5/2005
(Continued)

OTHER PUBLICATIONS

Master Lock: "Secure Online Ordering".*
(Continued)

*Primary Examiner* — Jonathan P Ouellette
(74) *Attorney, Agent, or Firm* — Cooper & Dunham LLP

(57) ABSTRACT

Method of making airline luggage inspection secure while accommodating the needs of the traveler comprises making a special lock available to airline travelers, the special lock having a combination lock portion and a master key lock, the master key lock portion receiving a master key that can open the master key lock portion of any special lock of this type. The special lock is designed to be applied to an individual piece of airline luggage and has indicia conveying to luggage purchasers that the special lock is "approved" by a luggage screening authority and conveying to the luggage screening authority that the special lock can be opened using the master key. The method includes providing the luggage screening authority directly or indirectly with exclusive access to the master key. The manufacturers and/or providers of the master key and special lock retain copies of the master key.

14 Claims, 2 Drawing Sheets

Related U.S. Application Data

No. 10/756,531, filed on Jan. 12, 2004, now Pat. No. 8,145,576, which is a continuation-in-part of application No. 10/706,500, filed on Nov. 12, 2003, now Pat. No. 7,021,537.

(51) Int. Cl.
| | |
|---|---|
| E05B 67/00 | (2006.01) |
| E05B 35/10 | (2006.01) |
| E05B 37/00 | (2006.01) |
| G06Q 30/02 | (2012.01) |
| G06Q 50/26 | (2012.01) |
| G06Q 99/00 | (2006.01) |

(52) U.S. Cl.
CPC ....... G06Q 30/0241 (2013.01); G06Q 50/265 (2013.01); G06Q 99/00 (2013.01); Y10T 70/413 (2015.04); Y10T 70/415 (2015.04); Y10T 70/417 (2015.04); Y10T 70/424 (2015.04); Y10T 70/7141 (2015.04); Y10T 70/7147 (2015.04); Y10T 292/491 (2015.04)

(58) Field of Classification Search
USPC ............ 70/25, 21, 34, 38, 409; 705/1.1–912
See application file for complete search history.

(56) References Cited

U.S. PATENT DOCUMENTS

| | | | |
|---|---|---|---|
| 3,068,682 A | 12/1962 | Russell et al. | |
| 3,559,429 A | 2/1971 | Hermann | |
| 3,952,559 A | 4/1976 | Atkinson | |
| 4,055,972 A | 11/1977 | Cuesta | |
| 4,137,567 A | 1/1979 | Grube | |
| 4,459,835 A | 7/1984 | Hurskainen | |
| 4,499,745 A | 2/1985 | Grube | |
| 4,557,122 A | 12/1985 | Hwang | |
| 4,621,509 A | 11/1986 | Mizuno | |
| 4,671,088 A | 6/1987 | Jeang | |
| 4,751,830 A | 6/1988 | Cheng | |
| 4,761,977 A | 8/1988 | Weatherby | |
| 4,770,013 A | 9/1988 | Nakai | |
| 4,838,052 A | 6/1989 | Williams et al. | |
| 4,866,958 A | 9/1989 | Bretl et al. | |
| 4,885,923 A | 12/1989 | Nakai | |
| 4,952,228 A | 8/1990 | Taylor et al. | |
| 5,009,087 A | 4/1991 | Long | |
| 5,089,692 A | 2/1992 | Tonnesson | |
| 5,134,869 A | 8/1992 | Gable | |
| 5,174,136 A | 12/1992 | Thwing | |
| 5,237,842 A * | 8/1993 | Rasch et al. | ............ 70/285 |
| 5,345,798 A | 9/1994 | Nakai | |
| 5,447,043 A | 9/1995 | Hwang | |
| 5,484,177 A | 1/1996 | Fortune et al. | |
| 5,485,734 A | 1/1996 | Yang | |
| 5,507,161 A | 4/1996 | Broekaert et al. | |
| 5,582,049 A | 12/1996 | Mauer | |
| 5,737,947 A | 4/1998 | Ling | |
| 5,845,519 A | 12/1998 | Loughlin | |
| 5,865,043 A | 2/1999 | Loughlin | |
| 6,145,356 A | 11/2000 | Thwing | |
| 6,151,936 A * | 11/2000 | Randall | ............ E05B 19/20 |
| | | | 29/426.1 |
| 6,173,592 B1 | 1/2001 | Yu | |
| 6,393,876 B1 | 5/2002 | Matyko | |
| 6,508,089 B1 | 1/2003 | Tsai | |
| 6,513,356 B1 | 2/2003 | Yang | |
| 6,516,644 B1 * | 2/2003 | Seliber | ............ 70/340 |
| 6,522,253 B1 | 2/2003 | Saltus | |
| 6,557,384 B1 | 5/2003 | Calegan | |
| 6,568,225 B1 | 5/2003 | Chang | |
| 6,574,999 B2 | 6/2003 | Chen | |
| 6,598,434 B2 | 7/2003 | Yang | |
| 6,877,345 B1 * | 4/2005 | Misner et al. | ............ 70/25 |
| 7,021,537 B2 * | 4/2006 | Tropp | ............ E05B 35/105 |
| | | | 235/384 |
| 7,036,728 B2 * | 5/2006 | Tropp | ............ E05B 35/105 |
| | | | 235/384 |
| 7,140,209 B2 * | 11/2006 | Lai | ............ 70/25 |
| 8,145,576 B2 * | 3/2012 | Tropp | ............ E05B 35/105 |
| | | | 292/315 |
| 2003/0089147 A1 | 5/2003 | Yang | |
| 2004/0226324 A1 | 11/2004 | Loughlin et al. | |
| 2004/0246069 A1 | 12/2004 | Queenan | |
| 2005/0081584 A1 | 4/2005 | Nugent | |
| 2005/0092036 A1 | 5/2005 | Lai | |
| 2006/0150690 A1 | 7/2006 | Laie et al. | |

FOREIGN PATENT DOCUMENTS

| | | |
|---|---|---|
| JP | 07217294 | 8/1995 |
| WO | WO2004/104329 A2 | 12/2004 |
| WO | WO2004/113651 A2 | 12/2004 |

OTHER PUBLICATIONS

FlyerTalk: "Checked bags: to lock or not to lock ?—FlyerTalk Forums."*
Jeffrey Leib, "Luggage Industry Struggles to Adapt to No-Lock Air-Security Rules" (hereinafter Leib).*
Master Lock Updated.*
McMaster Carr: Exhibit O.*
"Getting Back to Business: An update on the Travel Sentry Project"; Travel Goods Showcase Magazine Jul./Aug. 2003 issue.*
"Travel Sentry Combine" all citations retrieved www.travelsentry. com between Jul. 2003-Oct. 2003.*
*Travel Sentry. Inc.* v. *David A. Tropp*—Notice of Appeal dated Oct. 6, 2010.
*Lock Concept*, by J. Vermilye (Jan. 13, 2003).
*Lock Sentry Concept*, by J. Vermilye (Jan. 17, 2003).
Collection of documents from Transportation Security Administration: *Checked Baggage Screening* bates labeled TSA000001-176, including TSA000114-115 dated Dec. 30, 2002, TSA 000166 dated Feb. 10, 2003, TSA 000167 dated Feb. 6, 2003, TSA 000168-170 dated Jan. 3, 2003, TSA 000171 dated May 23, 2003, TSA 000172-173 dated May 14, 2003, and TSA 000174-176 dated Jan. 3, 2003.
J. Vermilye titled *Checked Baggage Screeing Issues, Plan of Attach. Briefing for Industry TSA Checked Baggage Customer Service*, bates labeled TS 000114-118.
*Introduction to Travel Sentry* bates labeled TS 000138-148 Mar. 27, 2003.
Apr. 15, 2011 European search report in connection with counterpart European patent application No. 04 80 9332.
*Travel Sentry launches partnership with the Travel Goods Association (TGA)* dated Mar. 26, 2003, bates labeled TS 003328.
Audrey Warren, *Travel Watch: Making Up for the Blackout*, Wall St. J., Aug. 20, 2003.
Master Locker Locks-Exh 33.
The New Dual Access Lock the Only Set-Your-own-Combination Lock with Key override, and hand-written exhibit 7 dated Jun. 5, 2007.
LOGIBAG The "new generation" left luggage locker.
LOGIBAG Information.
LOGIBAG L120 User's and Maintenance Manual—Mors Technologies Inc., including Figs. dated May 5, 1992.
Samsonite Lock Information.
Samsonite—*Our Strengths Are Legendary* 1992.
Samsonite catalog.
Memorandum of Understanding Agreement Between the Transportation Security Administration and Travel Sentry Regarding Travel Sentry Certified Locks Oct. 16, 2003.
Checked Baggage Implementation Guide, Dec. 23, 2002.
Baggage Screening, Dec. 20, 2002.
Index of Implementation Package, Dec. 23, 2002.
Hand sketch dated Jan. 10, 2003.
Need for a system, Dec. 19, 2002.

(56) References Cited

OTHER PUBLICATIONS

Warren, Audrey—Making up for the Blackout TheWall Street Journal, Aug. 20, 2003.
Portside Samsonite's New ightweight Hardside, Nov. 12, 2003.
The Travel Insider, Nov. 26, 2003.
Brookstone Lauches New Federally Recognized Travel Sentry Certified Luggage Locks Nov. 12, 2003.
Austin House Travel Sentry Certified Locks.
TSA Under Pressure to Stop Baggage Theft by Sara Kehaulani Coo Washington.com Jun. 2003.
Engle, Be Prepared for hand searches of luggage Los Angeles Times Apr. 2003.
Transportation Security Administrator Accepted and Recognized Locks.
Paris airport armsfind:Manheld at cnn.com Jan. 2003.
DeLollis, Fliers flood TSA with inspection gripes, USA Today Jul. 2003.
DeLollis—Even how you secure Luggage has changed. USA Today Aug. 2003.
Getting Back the Business www.travelsentry.org Aug. 2003.
*Travel Sentry, Inc. v. David A. Tropp, Fed. Cir., Slip op.*, Nov. 5, 2012, Appeal 2011-1023, -1367.
*Tropp v. Conair Corporation et al* EDNY, Civ. Action No. Case 1:08-ev-04446-ENV-RLM Nov. 15, 2012 Appeal 2011-1583.
Replacement Request for ExParte ReExamination of U.S. Pat. No. 7,021,537 dated Dec. 10, 2010.
Replacement Request for ExParte ReExamination of U.S. Pat. No. 7,036,728 dated Dec. 10, 2010.
Flyer Talk Internet Publication Dated Feb. 5, 2002.
Child Seat Internet Publications dated Dec. 1999-Jan. 31, 2002.
MCMaster-CARR Supply Co. Catalog 106 p. 2593, 2600 Copyright 2000.
cnn.com Transcript dated Aug. 22, 2002.
U.S. Government Commercial Item Description A-A 59486A for Padlock Set Dated Jul. 3, 2001.
Jeffrey Lieb, The Denver Post Knight Ridder/Tribune Business News (02891294 Supplie No. 95623148; Dec. 19, 2002).
Travel Sentry Press Release, Nov. 12, 2003.
The Eastern Company Reports Results for the $1^{st}$ Quarter 2004, and $3^{rd}$ Quarter 2003.
CCL Security Products New Release, Nov. 12, 2003.
Commercial Item Description Padlock (Combination) A-A-1928C Mar. 15, 2002.
Jeffrey Leib, Luggage Industry Struggles to Adapt to No-Lock Air-Security Rules, The Denver Post Knight Ridder/Tribune Business News, Jan. 13, 2003.
Travel Sentry Solutions, Aug. 16, 2003, http://web.archive.org/web/20030816051724/http://travelsentry.org/solutions.htm.
Travel Sentry Government, Oct. 1, 2003, http://web.archive.org/web/20031001171101/http://travelsentry.org/gov.htm.
Travel Sentry Frequently Asked Questions, Aug. 15, 2003, http://web.archive.org/web/20030815154236/http://travelsentry.org/faq.htm.
Travel Sentry launches partnership with the Travel Good Association (TGA), Aug. 17, 2003, http://web.archive.org/web/20030817151156/http://travelsentry.org/pr24mar03.htm.
New York Times, Business Travel: On the Road; A baggage Lock for You and the Federal Screeners. Nov. 11, 2003.
Kathy Bergen, New Baggage rules worry travelers Unlocked and loaded Airport Screening changing way people pack, secure luggage before taking flights. Chicago Tribune Ohio.com Feb. 7, 2003.
*Alice Corp. v. CL Banks*, 134 S. Ct. 2347 (2014).
*Travel Sentry, Inc. v. Troop*, 1:06-cv-06415 ENV-RLM-EDNY.
*Memorandum & Order Travel Sentry v. Tropp* case 1:06-cv-06415 and 1:08-cv-04446 filed Jun. 29, 2016.
*Judgement Travel Sentry v. Tropp* case 1:06-cv-06415 Jun. 29, 2016.
*Judgement Travel Sentry v. Tropp* case 1:08-cv-04446 Jun. 29, 2016.
Notice of Appeal United States Court of Appeals for The Federal Circuit 1:06-cv-06415—*Travel Sentry, Inc. V. Tropp* filed Jul. 22, 2016.
Notice of Appeal United States Court of Appeals for The Federal Circuit 1:08-cv-04446—*Travel Sentry, Inc. V. Tropp* filed Jul. 22, 2016.
United States Court of Appeals for The Federal Circuit Notice of Docketing 16-2386—*Travel Sentry, Inc. V. Tropp* Date of Docketing: Jul. 26, 2016.

* cited by examiner

MASTER KEY

DIAL TURN

METHOD OF IMPROVING AIRLINE LUGGAGE INSPECTION

CROSS-REFERENCE TO RELATED APPLICATIONS

This application is a continuation of application Ser. No. 13/412,233 filed Mar. 5, 2012, which is a continuation application of Ser. No. 10/756,531 filed on Jan. 12, 2004, now U.S. Pat. No. 8,145,576, which is a continuation in part of U.S. application Ser. No. 10/706,500 filed on Nov. 12, 2003, now U.S. Pat. No. 7,021,537. Application Ser. No. 10/988,433 filed Nov. 12, 2004, now U.S. Pat. No. 7,036,728, is a continuation in part of said application Ser. No. 10/756,531, now U.S. Pat. No. 8,145,576. The entire content of each is incorporated by reference herein.

FIELD OF THE INVENTION

The field of this invention is methods of improving airline luggage inspection, and more particularly, methods of making such inspection less intrusive and more secure.

BACKGROUND OF THE INVENTION AND DISCUSSION OF THE PRIOR ART

Due to the threat of terrorism, in the weeks prior to Jan. 1, 2003, the Transportation Security Administration ("TSA"), a division of the United States Department of Homeland Security, announced that with respect to luggage at United States airports if a TSA baggage screener was unable to open a traveler's bag for inspection because the bag was locked, the screener would have to break the locks on the traveler's bag. Hence, passengers should leave their bags unlocked, according to the TSA. Beginning Jan. 1, 2003 the TSA's federal workers started screening luggage at U.S. airports and when it deemed it necessary it started clipping locks on this luggage in order to open and inspect the luggage.

Since by definition airport luggage screening occurs outside the presence of the passengers whose luggage is being inspected, it is impossible or at least impractical for airport luggage screening personnel to make use of combinations to open combination locks on airport luggage. Nonetheless, passengers may desire to use combination locks to avoid worrying about loss of a key or finding the key.

Although arguably necessary for security, the method of screening luggage that includes opening the passenger's luggage in a manner that leaves the luggage "unlockable" after the inspection process, for example by clipping the heretofore workable lock, suffers from several drawbacks. First, the passenger's belongings have been damaged either because the lock has been clipped or because the luggage has been opened forcibly or both. This causes monetary damage. it also causes aggravation. Second, a new security hazard is generated since the passenger gets back a piece of luggage with a broken or removed lock. This means that during the remainder of the passenger's trip his or her luggage is not secure and can be tampered with. The remainder of the trip may even include further domestic flights. Furthermore, if travelers consistently have their locks broken, travelers will see no value in using locks when traveling, thereby exposing their unlocked luggage to a constant risk of tampering.

One should not assume that security risks exist only among passengers. Terrorists have tried in the past and may try in the future to compromise the workers at the airports who inspect luggage. Accordingly, the no longer secure piece of luggage is subject to the risk that a terrorist or other dangerous person who is within the area of the airport luggage screening personnel—because he is a worker or because he penetrated the secure area—can insert a bomb or other hazardous material into the luggage by easily opening it since it not only does not have a lock anymore but its outward appearance, i.e. a damaged lock, may advertise that it has been tampered with and be easily opened.

Furthermore, the sale of padlocks plummeted after the TSA began the practice of clipping locks. Another thing that happened was that the number of claims for theft and damage allegedly caused, by the government and/or airline personnel to passengers' luggage increased significantly since Jan. 1, 2003.

Another problem is that passengers are concerned about theft of the contents of their bags without the protection of locks (after their locks have been rendered useless by the luggage screening authorities)

Travelers understand and support the federal government's initiatives to thwart terrorism. This support of security regulations and procedures on the part of travelers is critical to their implementation and success. However, travelers, just getting accustomed to the new security laws, may have legitimate concerns about baggage inspections. It is crucial that the government or appropriate authorities act to diminish travelers' concerns in this regard.

In addition, working as a TSA luggage screener is a highly demanding and stressful job. Therefore, anything that reduces the physical strain would be highly appreciated by the screeners.

It should be born in mind that the number of airline travelers who pass through airports in the United States in a given year is close to half a billion. Thus, these concerns affect a great many individuals.

Accordingly, there is a compelling and immediate need for a method of inspecting luggage at airports that does not create a security risk and that is not damaging or aggravating to the passengers.

SUMMARY OF THE PRESENT INVENTION

The present invention presents a method of making airline luggage inspection secure while accommodating the needs of the traveler includes a first step of making a special lock available to airline travelers, the special lock having a combination lock portion and a master key lock, the master key lock portion for receiving a master key that can open the master key lock portion of any special lock of this type. The special lock is designed to be applied to an individual piece of airline luggage and has an indicia thereon conveying to luggage purchasers that the special lock is "approved" by a luggage screening authority and conveying to the luggage screening authority that the special lock can be opened using the master key. Then providing the luggage screening authority with exclusive access to the master key. The manufacturers and/or providers of the master key and special lock retain copies of the master key. In accordance with the method of the present invention, therefore, the luggage screening authority need not clip or otherwise break open locks to inspect luggage, nor do they have to break into the luggage in some other manner. The workers need only be told that master keys are available to open locks that have the indicia on them.

IMPORTANT OBJECTS AND ADVANTAGES

The following important objects and advantages of the present invention are:

(1) to provide a method of screening luggage at airports that avoids forcible opening of the luggage;

(2) to provide a method of screening luggage at airports that employs special locks that remain viable after being subjected to airport luggage screening and inspection;

(3) to provide a method of non-intrusively searching passenger's luggage at airports;

(4) to provide a method of screening luggage that uses a master key exclusively maintained by the luggage screening authority;

(5) to provide a method of improving luggage screening at airports that avoids the need for clipping the locks on passenger luggage;

(6) to provide a method of screening luggage at airports that eliminates a potential security threat of tampering with broken-into luggage or luggage whose locks have been broken;

(7) to provide a method of luggage screening that reduces the costs of the luggage screening authority;

(8) to provide a method of luggage screening that eliminates the need for lock clippers;

(9) to provide a luggage screening method that reduces injuries to luggage screeners that may arise from clipping locks;

(10) to provide an improved method of luggage screening at airports that requires essentially no new training;

(11) to provide a method of airport luggage screening that reduces the liability to the luggage screening authority;

(12) to provide an improved method of luggage screening that would not interfere with current policy of the luggage screening authority in that luggage locks could still be clipped if they did not display the indicia conveying that were "TSA approved" or authorized;

(13) to provide a luggage screening method that decreases the labor of luggage screeners in that opening the special lock of the method of the present invention requires less manual labor than breaking locks;

(14) to provide a method of luggage screening that provides a public relations benefit to the TSA or luggage screening authority in that travelers will appreciate the TSA or luggage screening authority's concern for their personal property, an important benefit for new agency;

(15) to provide a method of airport luggage screening that allows the luggage screening authority to get its work done more efficiently;

(16) to provide a method of airport luggage screening that allows a thorough search of the passenger's luggage while at the same time providing a less intrusive and more comfortable search to the passenger;

(17) to provide a method of screening luggage at airports that eliminates the danger of tampering with luggage that has been broken into subsequent to the screening process; and

(18) to provide a method that eliminates the need to break into the luggage at a point other than its lock.

DETAILED DESCRIPTION OF THE PREFERRED EMBODIMENT

Figure 1:
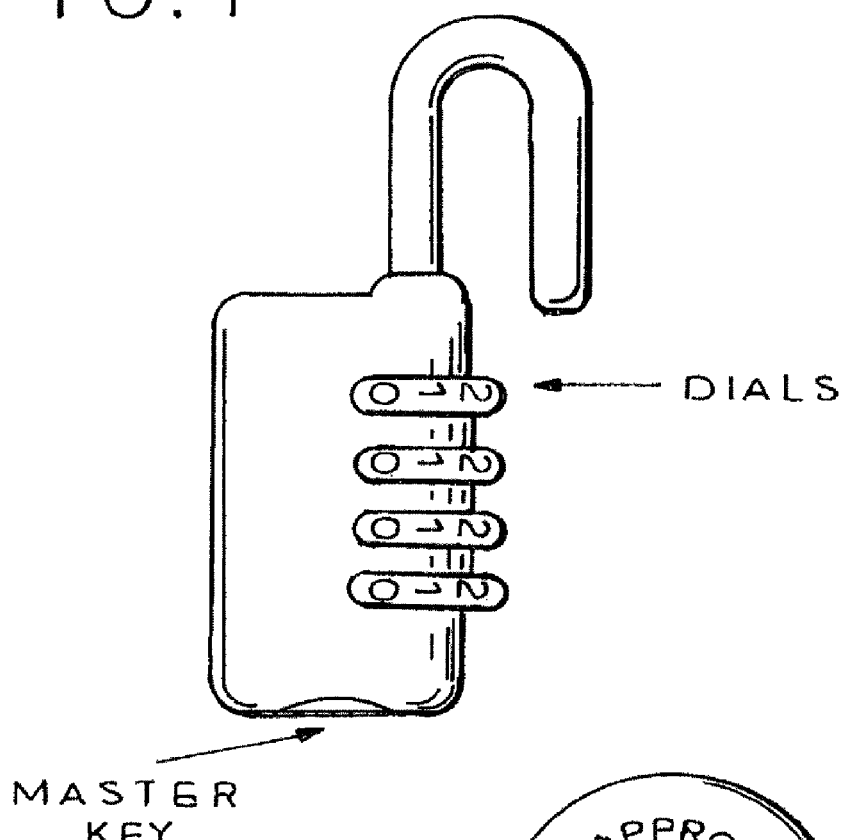
FIG. 1 is a front plan view of one embodiment of the special lock used in the method of the present invention in open position modified to show a key hole for a master key on the bottom.

The method of the present invention includes the step of making a special lock available to airline travelers, the special lock having a combination lock portion and having a master key lock, the master key lock portion for receiving a master key that can open the master key lock portion of any special lock of this type, the special lock designed to be applied to an individual piece of airline luggage. The special lock also has indicia thereon conveying to luggage purchasers and to the luggage screening authority that the special lock is a lock that the luggage screening authority has agreed not to break. The indicia can state, for example, that the special lock is "approved", "accepted" or "authorized" by the luggage screening authority. The term "indicia" is a broad term and can include the special lock having a distinctive physical characteristic such shape, texture, weight and/or other characteristic that makes it instantly recognizable by individuals working for the luggage screening authority who are specifically for that characteristic. Alternatively, a distinctive chemical or electronic characteristic can be used—in short any distinctive characteristic that can be instantly recognized by persons looking for it.

The phrase "any special lock of this type" is intended to include special locks having a multiplicity of sub-types such as different sizes, different manufacturing designs or styles, etc.

Besides making the special lock more valuable to prospective luggage purchasers or lock purchasers, such indicia also tells the luggage screening authority that the special lock can be opened by the luggage screening authority using the master key and that the special lock is among those locks that the luggage screening authority agrees not to break in order to inspect the luggage. The phrase "approved", "accepted" or "authorized" is a broad phrase intended to include other words or terms that signify that the luggage screening authority agrees that locks having such indicia will not be broken into.

The method of the present invention also includes the step of providing the luggage screening authority, directly or indirectly, with access to the master key. This step includes providing such access with the help of or in conjunction with another business entity, i.e. a third party. The access is to be exclusive except that one or more of the following entities may retain copies of the master key: the manufacturer of the special lock, since it may need to retool the special lock, the provider to the passengers of the special lock, which may or may not be the same as the manufacturers, the manufacturer and/or the provider of the master key to the luggage screening authority. It is anticipated that the manufacturer of the special lock will also provide the master key but other possibilities are also contemplated by the present invention.

The step of providing access may be accomplished by delivering one or more master keys to the luggage screening authority or by delivering one or master keys to a company or organization whose responsibility it is to cause said one or more master keys to be delivered to the luggage screening authority.

Access to the master key by the luggage screening authority includes having access to any appropriate number of such master keys by its workers or by any appropriate division of part of said luggage screening authority.

Although the present invention is a method of improving the inspection of airline luggage, the method of the present invention makes use of an apparatus. This apparatus is a special lock. The special lock is illustrated by reference to the accompanying drawings. Consequently, the special lock used in the method of the present invention has been assigned reference numeral 10 Other elements have been assigned the reference numerals referred to below.

Combination locks have certain advantages over locks with keys. For one thing, there is no need to fear loss of the key. Hence, it is advantageous to have combination locks on luggage used to fly with since flights tend to cause stress and stress can lead to loss of the key. Second, even if one has the key it takes time to retrieve it. If the luggage has to be opened suddenly then retrieval of the key is an inconvenience. Although combination locks require memorization of access to the coded combination, this is usually considered better than a key lock on balance to many passengers. Hence, there is a need for a method of improving luggage screening at airports that makes of a special lock that includes a unique combination but that is nonetheless convenient and secure for the passengers and for the airport luggage screening personnel.

As seen from FIGS. 1-4, special lock 10 includes a combination lock portion 20 having a unique combination and a master key lock. The master key lock portion is opened by a master key that is inserted in key hole 30. Typically, although not necessarily, the key hole would be inconspicuously placed on the bottom of the special lock 10. The combination lock portion can be any kind of combination lock portion suitable for use with a piece of luggage at an airport. The combination can be a front dial that is turned or several dials that are turned to set the combination.

Presently, the Transportation Security Administration, a division of the United States Department of Homeland Security has the task of screening travelers' luggage at airports. However, the term "luggage screening authority" is intended broadly to encompass both the Transportation Security Administration and any governmental entity or non-governmental organization whose task includes screening the luggage of travelers at airports in the United States or a non-governmental organization. Alternatively, the luggage screening authority can be a governmental entity or non-governmental organization whose task includes screening the luggage of travelers at airports in Canada or another country. Furthermore, the luggage screening authority is also intended to broadly include individual workers who screen luggage at airports and other personnel of the TSA or of some other entity or organization whose task it is to screen such luggage.

Thus, the master key allows the authorized agency's workers to have the ability to open any of the luggage that the workers inspect in a manner without clipping the lock. The indicia notifies the luggage screening authority which pieces of luggage has locks that lock the master key opens and it notifying purchasers of the special lock of an added value of the special lock. Market research exists to support the fact that customers will spend significantly more on luggage if they know that it comes with a lock that the luggage screening authorities such as the TSA recognize as being openable by their master key and without forcibly opening the luggage.

Figure 2:
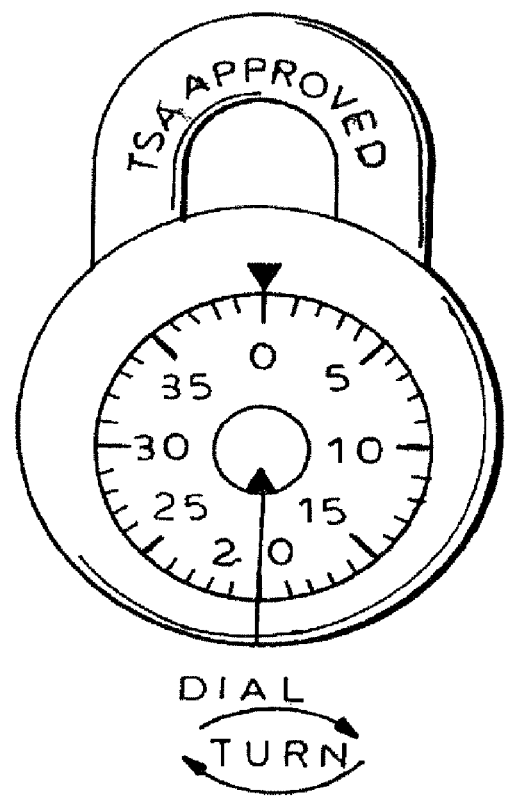
FIG. 2 is a front plan view of a second embodiment of the special lock used in the method of the present invention.
Figure 3:
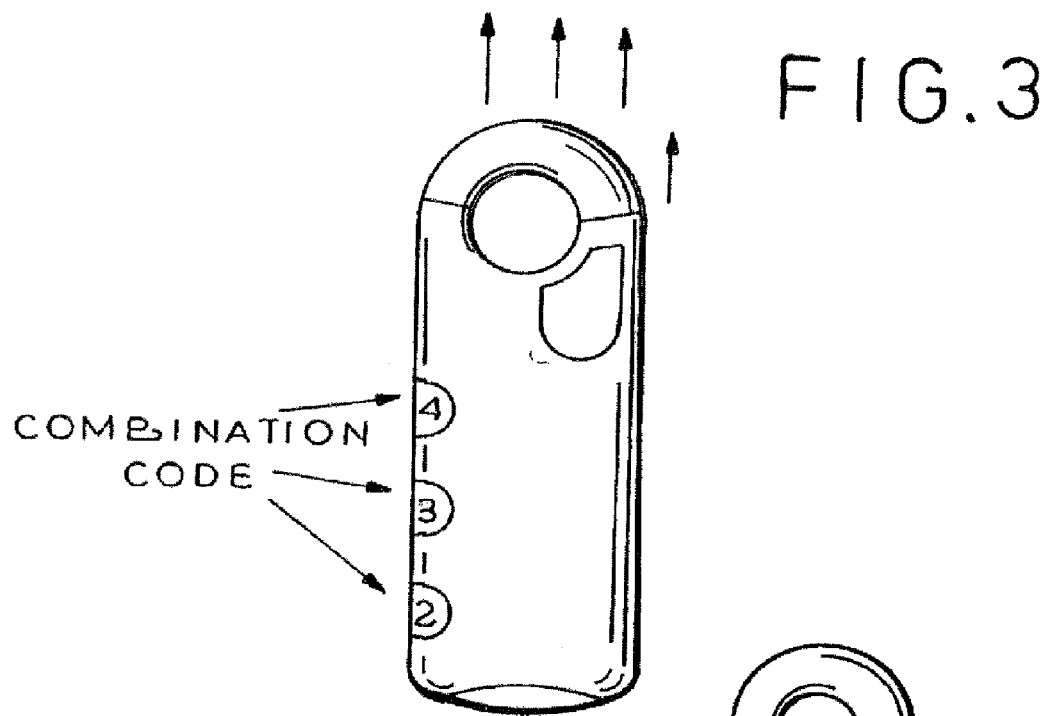
FIG. 3 is a front plan view of a second embodiment of the special lock used in the method of the present invention modified to show a key hole for a master key on the bottom.
Figure 4:
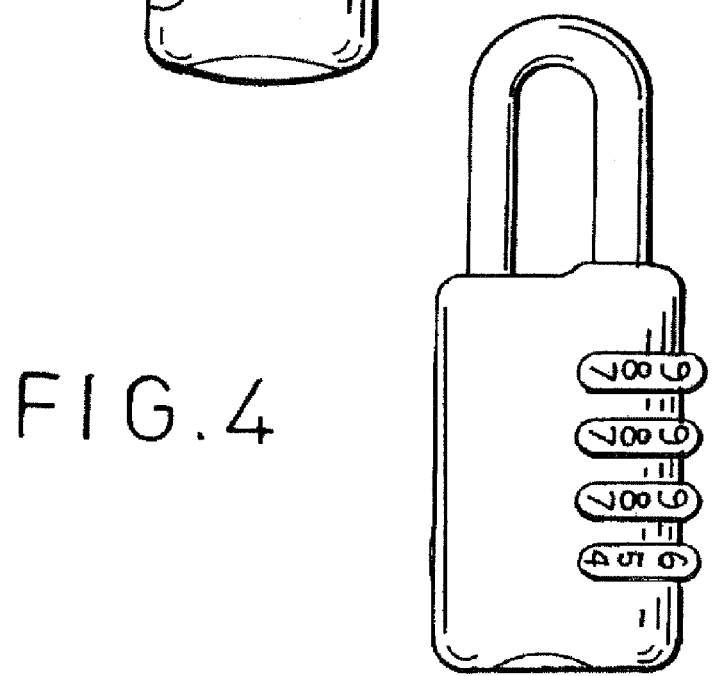
FIG. 4 shows the special lock depicted in FIG. 1 in closed position.

As seen in FIG. 2, the indicia 50 can take the form of a phrase "approved by the TSA" or any similar phrase or it can be anything else that conveys the approval, authority, acceptance etc. by the TSA or other relevant luggage screening authority. It should be understood that although one example of the indicia appears in FIG. 2 only, the other embodiments of the special lock used in the method of the present invention would also have the indicia.

It should be noted that with the use of the special lock by the traveler, the traveler still selects a combination for the combination lock portion of the special lock 10 and the traveler has that combination for the combination lock portion part of the special lock. Accordingly, the traveler still has a useful secure lock after passing airport security. In addition, the luggage screening authority still maintains an effective and quick way of accessing airport luggage for inspection whenever it deems doing so necessary.

It should be noted that the terms "master key" and "master key lock portion" are broad terms intended to also include electronic or other sensor mechanisms for opening up the master key lock portion in special lock 10. Thus, the method of the present invention contemplates using in certain embodiments a special lock 10 that makes use of an electronic sensor instead of a traditional physical key even though such a traditional physical key is what is typically understood by the term "master key". In such a case the locking mechanism inside special lock 10 would not be a traditional master key lock mechanism but rather would be a locking mechanism that is opened by an electronic sensor.

The present invention also contemplates that in certain embodiments other lock mechanisms besides a traditional combination lock can be used as one of the locks in special lock 10. Hence, in an alternative embodiment, the method would employ a first lock portion instead of a combination lock portion in special lock 10. The first lock portion can be any kind of locking mechanism useful for and easily accessible by the passenger.

It is to be understood that while the method of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

What is claimed:

1. Special lock luggage locks each of which comprises:
a combination lock portion;
a master key lock portion; and
indicia configured to convey to travelers and to a luggage screening authority that the authority can open the lock with a master key operating the master key lock portion of any of said special lock luggage locks;
wherein:
the combination lock portion of a first one of said special lock luggage locks comprises a three-dial combination lock but the combination lock of a second one of said special lock luggage locks comprises a four-dial combination lock;
said master key lock portion of any of said special lock luggage locks opens with said master key despite the different combination lock portions of the first and second special lock luggage locks; and
said special lock luggage locks remain viable after being subjected to luggage screening and inspection by opening the locks with said master key.

2. The special lock luggage locks of claim 1, in which said indicia of each of the locks comprise the symbols TSA.

3. The special lock luggage locks of claim 1, in which said indicia identify each of said locks as a lock that the Transportation Security Administration or other luggage screening authority can open with said master key without breaking the lock.

4. The special lock luggage locks of claim 1, wherein said indicia are the same for all the special locks but are different from any model or manufacturer designation.

5. The special lock luggage locks of claim 1, in which each of the locks has a key hole on a bottom of the lock for said master key that opens the master key lock portion of any of the locks.

6. The special lock luggage locks of claim 1, in which the locks include plural locks in which the combination lock portion is a three-dial combination lock and plural locks in which the combination lock portion is a four-dial combination lock.

7. Special lock luggage locks each of which comprises: a second lock portion; and
   indicia configured to convey to travelers and to a luggage screening authority that the authority can open the lock with a master key opening said master key lock portion of any of said special lock luggage locks;
   wherein:
      the second lock portion of a first one of said special lock luggage locks comprises one of the following lock mechanisms: (i) a three-dial combination lock, (ii) a four-dial combination lock, and (iii) a lock mechanism other than a combination lock;
      the second lock portion of a second one of the special lock luggage locks comprises one of said locking mechanisms (i), (ii), and (iii) but not the second locking mechanism in the first one of said special lock luggage locks; and
      said master key lock portion of any of said special lock luggage locks opens with said master key despite their different second lock portions.

8. The special lock luggage locks of claim 7, in which the second lock portion of the first special lock luggage lock is a three-dial combination lock.

9. The special lock luggage locks of claim 7, in which the second lock portion of the first special lock luggage lock is a four-dial combination lock.

10. The special lock luggage locks of claim 7, in which the second lock portion of the second lock is a lock mechanism other than a combination lock.

11. The special lock luggage locks of claim 7, wherein said indicia are the same on all the special locks but are different from any model or manufacturer designation.

12. The special lock luggage locks of claim 7, in which the luggage screening authority is the U.S. Transportation Security Administration.

13. The special lock luggage locks of claim 7, in which the luggage screening authority is an entity authorized to open luggage of airline travelers.

14. The special lock luggage locks of claim 5, in which the luggage screening authority is an entity authorized to screen luggage for security inspection.

\* \* \* \* \*

UNITED STATES PATENT AND TRADEMARK OFFICE
CERTIFICATE OF CORRECTION

PATENT NO. : 9,879,447 B2
APPLICATION NO. : 13/744261
DATED : January 30, 2018
INVENTOR(S) : David Tropp Page 1 of 1

It is certified that error appears in the above-identified patent and that said Letters Patent is hereby corrected as shown below:

In the Claims

Column 7, Line 18 (Claim 7, Line 1): after "comprises:" insert --a master key lock portion and--.

Signed and Sealed this
Third Day of April, 2018

Andrei Iancu
*Director of the United States Patent and Trademark Office*